(12) United States Patent  Kim

(10) Patent No.: US 10,897,583 B2
(45) Date of Patent: Jan. 19, 2021

(54) VIDEO CALL PROVIDING DEVICE, METHOD, SYSTEM, AND NON-TRANSITORY COMPUTER READABLE MEDIUM STORING A COMPUTER PROGRAM

(71) Applicant: LINE Corporation, Tokyo (JP)

(72) Inventor: Keum Ryong Kim, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 0 days.

(21) Appl. No.: 16/582,484

(22) Filed: Sep. 25, 2019

(65) Prior Publication Data
US 2020/0029028 A1   Jan. 23, 2020

Related U.S. Application Data

(63) Continuation of application No. PCT/KR2017/003348, filed on Mar. 28, 2017.

(51) Int. Cl.
*H04N 5/272* (2006.01)
*H04N 7/14* (2006.01)

(52) U.S. Cl.
CPC ............ *H04N 5/272* (2013.01); *H04N 7/141* (2013.01)

(58) Field of Classification Search
CPC ........ H04N 5/272; H04N 7/147; H04N 7/141; H04N 2007/145; G06K 9/00671;
(Continued)

(56) References Cited

U.S. PATENT DOCUMENTS 8,581,953 B2    11/2013  Kim
2008/0158334 A1*  7/2008  Reponen ................. G10L 15/26
                                                    348/14.02
(Continued)

FOREIGN PATENT DOCUMENTS

KR    10-2008-0016145 A    2/2008
KR    10-2009-0054609 A    6/2009
(Continued)

OTHER PUBLICATIONS

International Search Report PCT/ISA/210 for International Application No. PCT/KR2017/003348 dated Dec. 19, 2017.
(Continued)

*Primary Examiner* — Yogeshkumar Patel
(74) *Attorney, Agent, or Firm* — Harness, Dickey & Pierce, P.L.C.

(57) ABSTRACT

A video call providing method using a video call providing device capable may include: transmitting or receiving, by the video call providing device, a signal of displaying a first effect while the video call is performed to or from the external communication device; transmitting or receiving, by the video call providing device, a signal of displaying a second effect to or from the external communication device, after the first effect is transmitted or received; verifying, by the video call providing device, a type of the first effect, and a type of the second effect, after the second effect is transmitted or received; determining, by the video call providing device, an additional output of an effect and an additional effect to be output; and displaying, by the video call providing device, the additional effect, based on the determined additional output and additional effect.

17 Claims, 10 Drawing Sheets

(58) Field of Classification Search
CPC ........... G06K 9/00335; G06K 9/00597; G06K 9/0061; G06K 2009/00738; G10L 25/63
See application file for complete search history.

(56) References Cited

U.S. PATENT DOCUMENTS

| | | |
|---|---|---|
| 2010/0103243 A1 | 4/2010 | Won et al. |
| 2010/0134588 A1* | 6/2010 | Kim .................. H04N 7/147 |
| | | 348/14.02 |
| 2017/0332045 A1* | 11/2017 | Metter ................ H04L 65/1089 |

FOREIGN PATENT DOCUMENTS

| | | |
|---|---|---|
| KR | 10-2010-0034540 A | 4/2010 |
| KR | 10-2010-0062207 A | 6/2010 |

OTHER PUBLICATIONS

Written Opinion of the International Searching Authority PCT/ISA/237 for International Application No. PCT/KR2017/003348 dated Dec. 19, 2017.

\* cited by examiner

VIDEO CALL PROVIDING DEVICE, METHOD, SYSTEM, AND NON-TRANSITORY COMPUTER READABLE MEDIUM STORING A COMPUTER PROGRAM

CROSS-REFERENCE TO RELATED APPLICATIONS

This application is a continuation of, and claims the benefit of priority under 35 U.S.C. § 365(c) from, PCT International Application No. PCT/KR2017/003348, which has an International filing date of Mar. 28, 2017, which designates the United States of America, the contents of which are hereby incorporated by reference in its entirety.

TECHNICAL FIELD

Various example embodiments of the present disclosure relate to a video call providing device, method, system, and/or a non-transitory computer readable medium storing a computer program.

BACKGROUND

With the development of information and communication technologies and technologies related to electronic devices, such as desktop computers, laptop computers, smart phones, and the like, a user is now able to use various functions through the electronic devices connected to a communication network, such as the Internet.

Such various functions include video calls. In other words, with the development of information and communication technologies, it is now possible to transmit and receive signals simply including voice information together with signals including image information by capturing images of people on the phone in real time.

SUMMARY

At least one example embodiment provides a video call providing device, method, system, and/or non-transitory computer readable medium storing a computer program capable of transmitting and receiving signals capable of generating visual or auditory effects of various types when video calls are performed.

At least one example embodiment provides a video call providing device, method, system and/or non-transitory computer readable medium storing a computer program for verifying whether pre-transmitted and pre-received effects satisfy certain conditions and generating additional effects based on results of the verification, when video calls providing effect display functions are performed.

According to an aspect of at least one example embodiment, a video call providing method using a video call providing device capable of performing a video call with an external communication device, the video call providing method includes: receiving, using at least one processor of the video call providing device, a first effect signal during a video call between the video call providing device and the external communication device, the first effect signal including information regarding a first effect corresponding to the video call; receiving, using the at least one processor, a second effect signal, the second effect signal including information regarding a second effect corresponding to the video call; verifying, using the at least one processor, an effect type of the first effect, and an effect type of the second effect, the verifying including, determining whether the first effect signal was input by a first user of the video call providing device or a second user of the external communication device, and determining whether the second effect signal was input by the first user or the second user; determining, using the at least one processor, whether an additional effect is to be displayed based on results of the verifying; and displaying, using the at least one processor, the first effect and the additional effect on a display device based on results of the determining whether the additional effect is to be displayed.

These general and specific aspects may be implemented by using a system, method, apparatus, and/or non-transitory computer readable medium storing a computer program, or any combination of systems, methods, apparatuses and/or non-transitory computer readable mediums.

According to another aspect of at least one example embodiment, a video call providing device includes: a memory having computer readable instructions stored thereon; and at least one processor configured to execute the computer readable instructions to receive a first effect signal during a video call between the video call providing device and an external communication device, the first effect signal including information regarding a first effect corresponding to the video call, receive a second effect signal, the second effect signal including information regarding a second effect corresponding to the video call, verify an effect type of the first effect and an effect type of the second effect, the verification including, determining whether the first effect signal was input by a first user of the video call providing device or a second user of the external communication device, and determining whether the second effect signal was input by the first user or the second user, determine whether an additional effect is to be displayed based on results of the verification, and display the first effect and the additional effect on a display device based on results of the determining whether the additional effect is to be displayed.

According to at least one example embodiment, a video call providing device, method, system, and/or non-transitory computer readable medium storing a computer program for transmitting and receiving signals capable of generating visual or auditory effects of various types can be provided when video calls are performed.

Also, a video call providing device, method, system, and/or non-transitory computer readable medium storing a computer program for verifying whether pre-transmitted and pre-received effects satisfy certain conditions and generating additional effects based on results of the verification can be provided when video calls providing effect display functions are performed.

DETAILED DESCRIPTION

Figure 1:
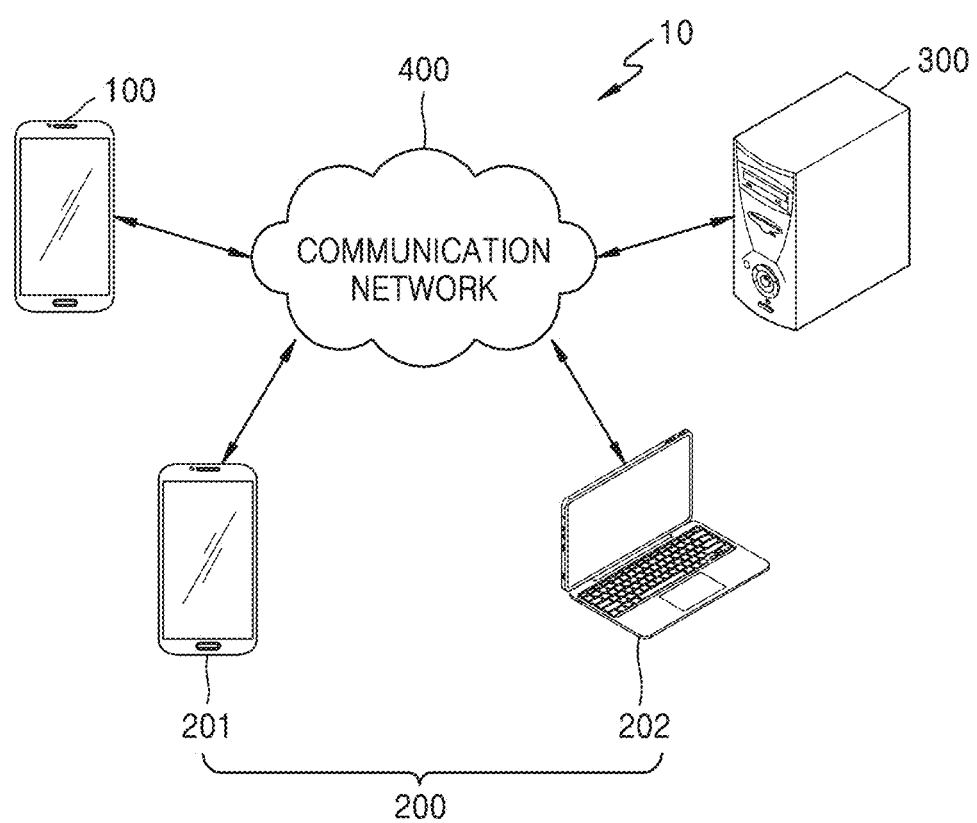
FIGS. 1 and 2 are diagrams schematically showing a configuration of a video call providing system according to at least one example embodiment.

Reference will now be made in detail to various example embodiments, examples of which are illustrated in the accompanying drawings. In this regard, the present example embodiments may have different forms and should not be construed as being limited to the descriptions set forth herein. Accordingly, the example embodiments are merely described below, by referring to the figures, to explain aspects of the present description. While such terms as "first", "second", etc., may be used to describe various components, such components must not be limited to the above terms. The above terms are used only to distinguish one component from another. An expression used in the singular encompasses the expression of the plural, unless it has a clearly different meaning in the context. In the present specification, it is to be understood that the terms such as "including" or "having," etc., are intended to indicate the existence of the features or components, and are not intended to preclude the possibility that one or more other features or components may exist or may be added. In the drawings, for convenience of description, sizes of components may be exaggerated for clarity. For example, since sizes and thicknesses of components in the drawings are arbitrarily shown for convenience of description, the sizes and thicknesses are not limited thereto.

Various example embodiments will be described below in more detail with reference to the accompanying drawings. Those components that are the same or are in correspondence are rendered the same reference numeral regardless of the figure number, and redundant explanations are omitted.

Figure 2:
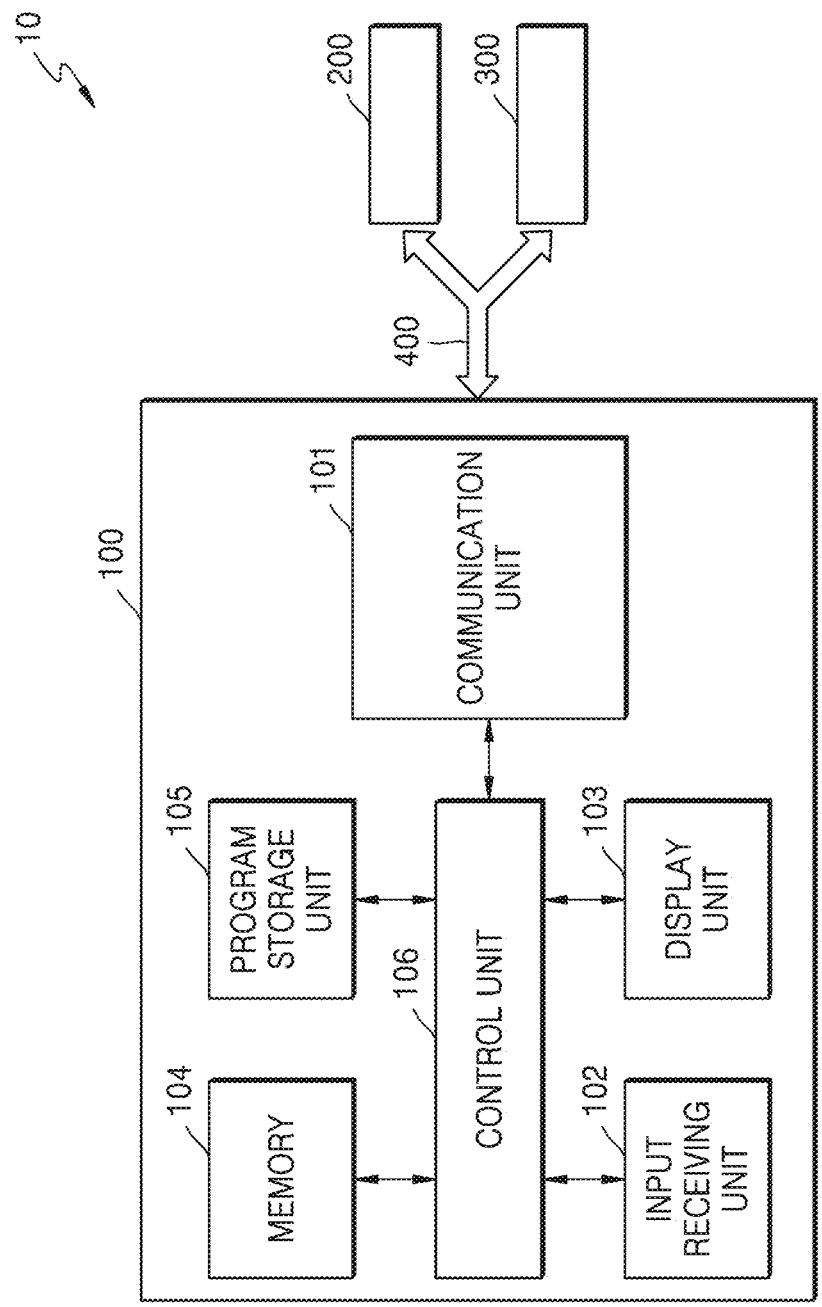

FIGS. 1 and 2 are diagrams schematically showing a configuration of a video call providing system according to at least one example embodiment.

First, referring to FIG. 1, a video call providing system 10 according to at least one example embodiment may include a video call providing device 100, an external communication device 200, a server 300, and/or a communication network 400, etc., but is not limited thereto.

The video call providing device 100 may denote a communication terminal capable of transmitting and/or receiving electronic signals to and/or from the external communication device 200 in a wired and/or wireless communication environment. Here, the electronic signal may include auditory information, but is not limited thereto. The auditory information may include information related to sound receivable through a voice receiving unit of the video call providing device 100 and/or of the external communication device 200 when a call is made through the video call providing device 100, and/or information related to sound output through a voice output unit of the video call providing device 100 and/or of the external communication device 200.

Also, the electronic signal may include image information. Here, the image information may include information of an image and/or video captured through a capturing unit of the video call providing device 100 and/or of the external communication device 200 when a video call is made through the video call providing device 100, information related to a still image and/or a video that may be stored in a memory of the video call providing device 100 and/or of the external communication device 200, and information related to an image and/or video displayable on a display unit of the video call providing device 100 and/or of the external communication device 200.

Also, the electronic signal may include information for displaying a visual signal (e.g., image data, video data, etc.) on the display unit of the video call providing device 100 and/or of the external communication device 200. Here, the visual signal may be visually recognized as an alphabet, a drawing, a picture, or the like, and may indicate an object or a group of objects through which information may be transferred to another party in a visual form. For example, the visual signal may include a text message, a drawing, colors, and/or a picture, etc., which may be displayed on the display unit of the video call providing device 100, may include a sentence or an emoticon, which may be generated in combination thereof, but the example embodiments are not limited thereto.

Meanwhile, there may be a plurality of the external communication devices 200 included in one video call providing system 10. For example, the video call providing system 10 may include a first external communication device 201 and/or a second external communication device 202, but the example embodiments are not limited thereto. In this case, the video call providing device 100 may perform the video call with any one of the plurality of external communication devices 200, etc. For example, the video call providing device 100 may perform the video call with the first external communication device 201 and/or perform the video call with the second external communication device 202, etc. Additionally, the video call providing device 100 may perform the video call with two or more of the plurality of external communication devices 200, as a conference call. For example, the video call providing device 100 may perform a multilateral video call simultaneously with the first external communication device 201 and the second external communication device 202, etc.

In FIG. 1, electronic devices in the forms of a smart phone and a laptop computer are illustrated as examples of the video call providing device 100 and/or the external communication device 200. However, the example embodiments are not limited thereto, and any electronic device capable of transmitting and receiving data with another electronic device in a wired and/or wireless communication environment (e.g., wired and/or wireless network, such as the Internet, etc.) may be unlimitedly included in the video call providing device 100 and/or the external communication device 200.

For example, the video call providing device 100 and/or the external communication device 200 may include a desktop computer, a tablet personal computer (PC), a smart TV, a mobile phone, a personal digital assistant (PDA), a media player, a micro-server, a global positioning system (GPS) device, an electronic book terminal, a digital broadcasting terminal, a navigation device, a kiosk, an MP3 player, a digital camera, a wearable device, or another mobile or non-mobile computing device, but the example embodiments are not limited thereto. Moreover, the video call providing device 100 and/or the external communication device 200 may include various devices for receiving a touch input (e.g., receiving an instruction from a user, such as an effect signal instruction, etc.), such as an electronic blackboard, a touch table, a touch screen, and the like. Also, the video call providing device 100 and/or the external communication device 200 may include an accessory, such as a watch, glasses, a hairband, or a ring, which has a communication function and a data processing function, but the example embodiments are not limited thereto.

Meanwhile, the video call providing device 100 and the external communication device 200 may not be distinguished by features of hardware or software, but may be distinguished by a subject selected to describe operations of the example embodiments. In particular, when a video call providing method of at least one example embodiment is described by using two electronic devices capable of providing a video call function, one electronic device may be referred to as the video call providing device 100 and the other electronic device may be referred to as the external communication device 200, etc.

The server 300 may be a server used to provide a video call service. In FIG. 1, one server is illustrated, but a plurality of servers may be connected to each other via wired and/or wireless network communication, based on traffic or a data amount, etc.

The server 300 may provide data received from any one of the video call providing device 100 and/or the external communication device 200 to both or one of the video call providing device 100 and/or the external communication device 200, but the example embodiments are not limited thereto.

The server 300 may provide, in addition to a video call providing service, a general search service and various other services for enhancing the utility and convenience of a user. In other words, the server 300 may provide various services, such as a search service, an email service, a blog service, a social network service, a news service, a video/music streaming service, a gaming service, and/or a shopping information providing service, etc., in addition to the video call providing service, but the example embodiments are not limited thereto.

Additionally, the server 300 may be a device included in a server providing a portal service, such as a search service, an email service, a social network service, a news service, a video/music streaming service, a gaming service, and/or a shopping service, etc. The server providing the portal service may be a server providing a webpage provided by the portal service to the video call providing device 100 and/or the external communication device 200 requesting the portal service to provide information. Here, the server 300 and the server providing the portal service may be physically separated servers or may be logically separated servers in one physical server, etc.

In FIG. 1, the video call providing device 100 and/or the external communication device 200 are illustrated to be connected to transmit and receive data directly between through the communication network 400, and data may be transmitted and received in this manner. However, under the video call providing system 10 according to at least one example embodiment, data transmission and reception between the video call providing device 100 and/or the external communication device 200 may be performed only through the server 300. In other words, for example, a visual signal transmitted in an electronic signal from the video call providing device 100 may be transmitted to the server 300 through the communication network 400, and then the visual signal may be transmitted from the server 300 to the external communication device 200 through the communication network 400.

The communication network 400 may perform a function of connecting the video call providing device 100, the external communication device 200, and the server 300. Examples of the communication network 400 include wired networks, such as a local area network (LAN), a wide area network (WAN), a metropolitan area network (MAN), and an integrated service digital network (ISDN), and wireless networks, such as wireless LAN, CDMA, GSM, 4G LTE, 5G NR, Bluetooth, WiFi, Near Field Communications (NFC), and/or satellite communication, etc., but the scope of the example embodiments are not limited thereto.

Referring to FIG. 2, the video call providing device 100 may include a communication unit 101, an input receiving unit 102, a display unit 103, a memory 104, a program storage unit 105, and/or a control unit 106, etc., but is not limited thereto.

The communication unit 101 may perform wired and/or wireless communication with the external communication device 200 and/or the server 300 via the communication network 400, etc. The communication unit 101 (e.g., communication transceiver, etc.) may transmit and/or receive data including voice information and/or image information provided during the video call to and/or from the external communication device 200 and/or the server 300 via the communication network 400. The communication unit 101 may be a Bluetooth communication unit, a Bluetooth low energy (BLE) communication unit, a near field communication unit, a wireless local area network (WLAN) communication unit, a Zigbee communication unit, an infrared data association (IrDA) communication unit, a Wi-Fi direct (WFD) communication unit, an ultra wideband (UWB) communication unit, and/or an Ant+ communication unit, etc., but is not limited thereto.

The input receiving unit 102 may receive a user input related to the video call. For example, the input receiving unit 102 (e.g., input device, etc.) may receive a voice input of the user, an alphabet input (e.g., text input) of the user, an image/video input of the user, and/or a touch input of the user, etc., but the scope of the example embodiments are not limited thereto. For example, the input receiving unit 102 may include a microphone to receive voice data of the user, a camera to capture an image and/or video data, a keyboard and mouse to receive user inputs, etc. Also, the input receiving unit 102 may include a touch unit (e.g., touch screen, etc.) receiving a touch input (e.g., gesture operation, etc.) of the user requesting an output and/or display of an effect, such as an emoticon or the like, on a video call screen. At least a part of the input receiving unit 102 may be configured as one touch screen by forming a layer structure with the display unit 103 (e.g., display panel, display device, etc.). In this case, at least the part of the input receiving unit 102 and the display unit 103 may form one physical shape.

The display unit 103 may display information processed by the video call providing device 100. The display unit 103 may display a visual effect transmitted and received between the video call providing device 100 and the external communication device 200, but is not limited thereto. For example, the display unit 103 may display a visual effect transmitted and/or received by the user of the video call providing device 100 and/or the external communication device 200, etc.

The display unit 103 may include at least one of a liquid crystal display, a thin film transistor-liquid crystal display, an organic light-emitting diode display, a flexible display, a 3-dimensional (3D) display, and/or an electrophoretic display, etc., but the scope of the example embodiments are not limited thereto. The video call providing device 100 may include two or more display units 103 according to at least one example embodiment.

The memory 104 may perform a function of temporarily and/or permanently storing data processed by the control unit 106. Here, the memory 104 may include a magnetic storage medium and/or a flash storage medium, etc., but the scope of the example embodiments are not limited thereto. The memory 104 may perform a function of storing data transmitted and/or received to and/or from the external communication device 200 and/or the server 300.

The program storage unit 105 may be a component on which software performing various necessary or auxiliary various tasks while providing the video call service is mounted.

The control unit 106 may control overall operations of the video call providing device 100 in general. For example, the control unit 106 may generally control the communication unit 101, the input receiving unit 102, the display unit 103, the memory 104, and other components included in the video call providing device 100 by executing the software stored in the program storage unit 105 included in the video call providing device 100.

The control unit 106 may include any type of device capable of processing data, such as one or more processors. Here, the 'processor' may denote, for example, a data processing device embedded in hardware and including a physically structured circuit to perform a function expressed in code or commands (e.g., computer readable instructions) included in a special purpose program corresponding to at least one example embodiment, which when executed by the processor, transforms the data processing device into a special purpose processor for executing the special purpose program. Examples of the data processing device embedded in hardware include processing devices, such as a microprocessor, a central processing unit (CPU), at least one processor core, a multiprocessor, an application specific integrated circuit (ASIC), and a field programmable gate array (FPGA), but the scope of the example embodiments are not limited thereto.

Figure 3:
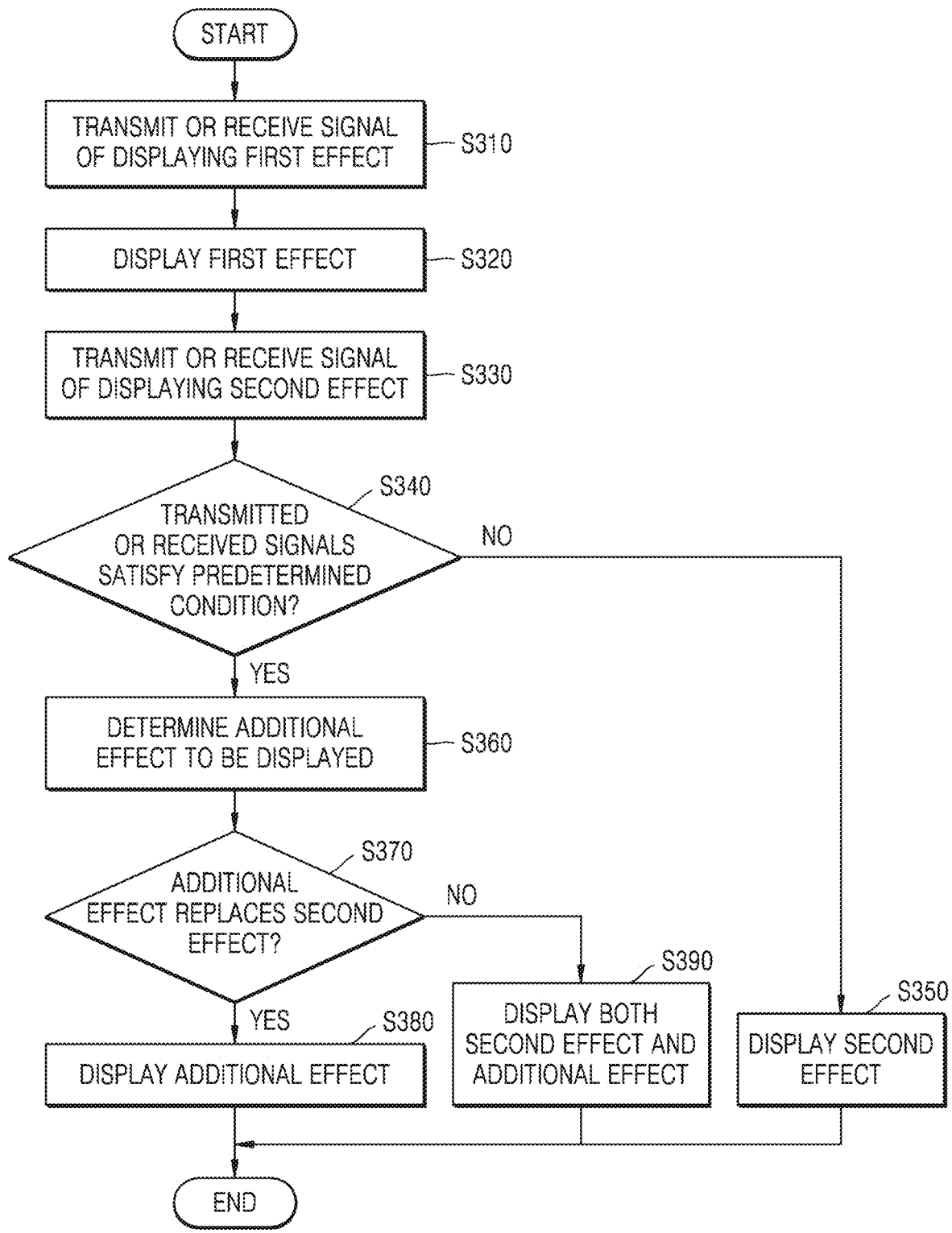
FIGS. 3 through 5 are flowcharts of a video call providing method according to at least one example embodiment.
Figure 4:
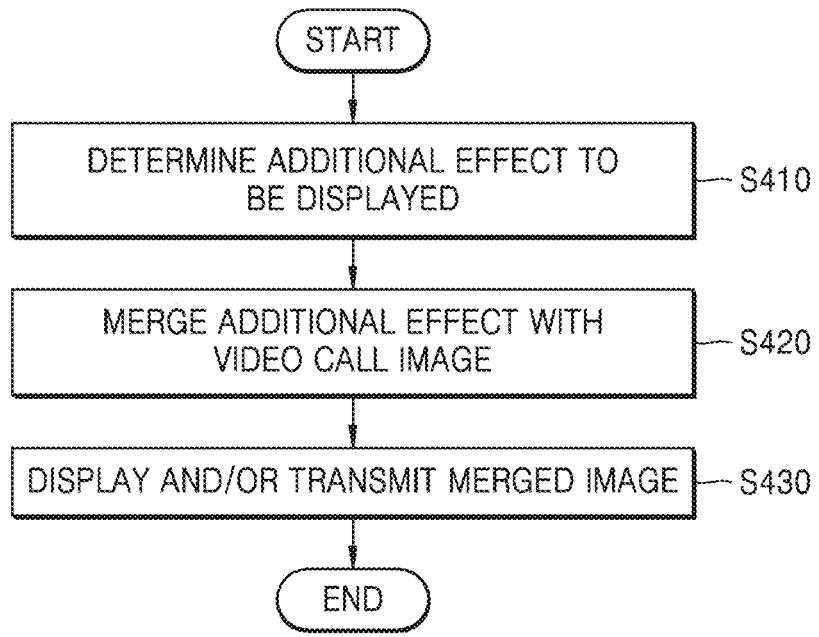
Figure 5:
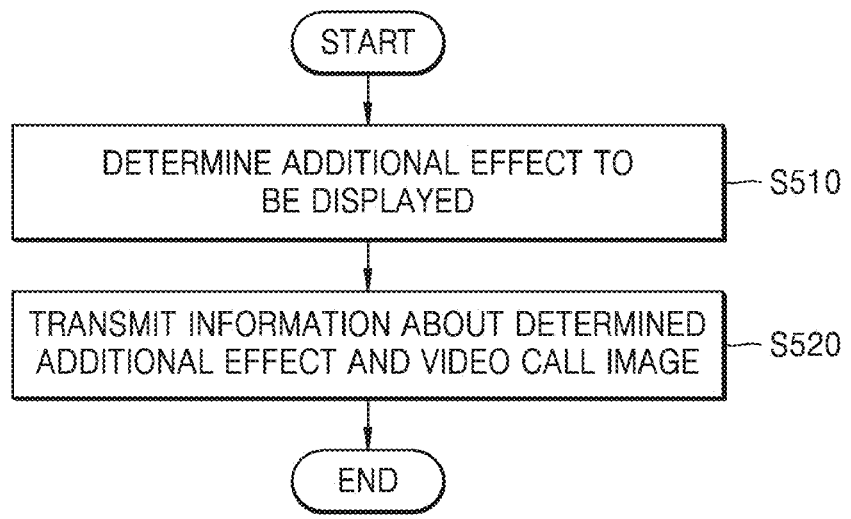

FIGS. 3 through 5 are flowcharts of a video call providing method according to at least one example embodiment.

Referring to FIG. 3, the video call providing device 100 performing the video call providing method according to at least one example embodiment may transmit and/or receive a signal of displaying a first effect while performing a video call (operation S310).

In particular, the video call providing device 100 may provide a video call function with the external communication device 200, but is not limited thereto. The video call providing device 100 may receive, from the user, an input of displaying the first effect on the video call providing device 100 and the external communication device 200 while a video call is provided between the video call providing device 100 and the external communication device 200. When such an input is received, the video call providing device 100 may transmit the signal (e.g., instruction, command, data, etc.) of displaying the first effect to the external communication device 200. Also, the external communication device 200 may receive the signal (e.g., instruction, command, data, etc.) of displaying the first effect.

According to at least one example embodiment, a signal of displaying a certain effect may be a signal causing the certain effect to be displayed on an electronic device. Here, the signal of displaying the certain effect may be a control signal commanding displaying of the certain effect and/or a signal directly including image information for displaying the certain effect, etc.

A case in which the video call providing device 100 transmits the signal of displaying the first effect to the external communication device 200 may be assumed.

Here, for example, the signal of displaying the first effect may be an image signal (e.g., image instruction, etc.) in which the first effect is merged with a video call image (e.g., video call data, etc.). In this case, the external communication device 200 may receive the signal of displaying the first effect, i.e., the image signal in which the first effect is merged with the video call image, and display the video call image on the display unit.

As another example, the signal of displaying the first effect may be a signal including an identification (ID) indicating a type of the first effect, etc. In this case, the external communication device 200 may verify and/or determine the ID (e.g., type ID) by receiving and analyzing the signal of displaying the first effect, realize the first effect via a control operation of directly generating the first effect in the external communication device 200, and add and display the first effect to the video call image.

As another example, the signal of displaying the first effect may be an image signal indicating the first effect but is a separate image signal different from the video call image. In this case, the external communication device 200 may display the video call image extracted from a video call image signal and a first effect image extracted from the signal of displaying the first effect together on the display unit. At this time, the external communication device 200 may set the first effect image to be, for example, an upper layer of the video call image such that the first effect is recognized by the user, but is not limited thereto.

In the above examples, it is assumed that the video call providing device 100 generates the signal of displaying the first effect and transmits the signal to the external communication device 200, but according to other example embodiments, similar operations may be performed in the video call providing device 100 even when the signal of displaying the first effect generated by the external communication device 200 is received by the video call providing device 100. In other words, when the signal of displaying the first effect received by the video call providing device 100 is the image signal, in which the first effect and the video call image are merged, the video call providing device 100 may display the first effect by displaying the merged video call image included in the signal of displaying the first effect. Additionally, when the type of signal of displaying the first effect received by the video call providing device 100 is the signal including information about the ID (e.g., type ID) of the first effect, the video call providing device 100 may directly select and display the first effect. Moreover, when the signal of displaying the first effect received by the video call providing device 100 is a first effect image signal, the video call providing device 100 may display the first effect image extracted from the first effect image signal together with the video call image extracted from a video call image signal.

Also, the signal of displaying the first effect may include a temporal and/or spatial sync signal between the video call image and the first effect image.

The first effect may be displayed on the display unit 103 of the video call providing device 100 together with the video call image. For example, the first effect may be a weeping emoticon, and in this case, the first effect may be displayed by overlapping the eyes of the user of the video call providing device 100 or the external communication device 200 in the video call image. In this case, the first effect may be displayed on a layer having higher priority than the video call image. In other words, the video call image may be displayed by occupying almost all regions of the display unit 103 of the video call providing device 100 and the first effect may be displayed by overlapping the video call image on the layer having higher priority than the video call image.

Meanwhile, the video call providing device 100 may use a face recognition function of the user while capturing an image of the user with a camera to perform the video call. For example, when the image of the user is captured with the camera included in the video call providing device 100, the video call providing device 100 may recognize the face of the user from the captured image. At this time, the video call providing device 100 may obtain at least one feature from the captured image, such as the eyes, the nose, the mouth, and/or the face shape, etc., of the user by analyzing the captured image. Then, the video call providing device 100 may display an effect based on a specific location of the recognized face of the user. For example, when an effect to be displayed is tears, the video call providing device 100 may display the effect at the eye regions of the face.

Then, the video call providing device 100 may display the first effect (operation S320). Here, the video call providing device 100 may have generated the signal of displaying the first effect or the external communication device 200 may have received the signal of displaying the first effect. In other words, the video call providing device 100 may display an effect in both cases when the effect to be displayed is directly determined and when a signal of displaying the effect is received from an external source.

At this time, the video call providing device 100 may determine a location for displaying the first effect based on whether the video call providing device 100 determined the display of the first effect or whether the signal of displaying the first effect is received from the external source. For example, when the video call providing device 100 determined the display of the first effect, the first effect may be displayed on the face of the user of the video call providing device 100. Also, when the signal of displaying the first effect is received from the external communication device 200, the first effect may be displayed on the face of the user of the external communication device 200. Additionally, when the video call providing device 100 determined the display of the first effect, the first effect may be displayed on the face of the user of the external communication device 200. Also, when the signal of displaying the first effect is received from the external communication device 200, the first effect may be displayed on the face of the user of the video call providing device 100. The determination as to which face of which user the first effect is to be displayed by the video call providing device 100 may be determined based on the setting of the video call providing device 100 or a feature of the first effect, etc., but the example embodiments are not limited thereto.

Next, the video call providing device 100 may transmit and/or receive a signal of displaying a second effect (operation S330).

In particular, the video call providing device 100 may receive, from the user, an input of displaying the second effect on the video call providing device 100 and/or the external communication device 200 while the video call is provided between the video call providing device 100 and the external communication device 200. When such an input is received, the video call providing device 100 may transmit the signal (e.g., instruction, command, data, etc.) of displaying the second effect to the external communication device 200. Also, the external communication device 200 may receive the signal (e.g., instruction, command, data, etc.) of displaying the second effect.

Here, the signal of displaying the second effect may be any type of signal causing the second effect to be displayed on an electronic device, like the signal of displaying the first effect.

Then, the video call providing device 100 may verify whether a desired and/or predetermined condition is satisfied in relation to the transmission and/or reception of the signal of displaying the first effect and the transmission and/or reception of the signal of displaying the second effect (operation S340). When it is determined that the desired and/or predetermined condition is not satisfied based on a result of the verification in operation S340, the video call providing device 100 may display the second effect (operation S350). In other words, when a condition for displaying an additional effect is not satisfied, the video call providing device 100 may end an effect displaying process by simply displaying the second effect currently requested to be displayed on the display unit 103. When it is determined that the desired and/or predetermined condition is satisfied based on the result of the verification in operation S340, the video call providing device 100 may determine an additional effect to be displayed (operation S360).

Here, the desired and/or predetermined condition verified by the video call providing device 100 may include a type of the first effect and a type of the second effect. In other words, according to at least one example embodiment, when at least two effects transmitted and/or received have a specific relationship, displaying an additional effect corresponding to the relationship. However, the example embodiments are not limited thereto, and, for example, there may be a lesser or greater number of effects applied to the video call.

For example, the user of the video call providing device 100 and the user of the external communication device 200 may play the rock-paper-scissors game, but is not limited thereto. In this case, the first effect may be an effect of the scissors input by the user of the video call providing device 100 and the second effect may be an effect of the rock input by the user of the external communication device 200. The effect of the scissors input by the user of the video call providing device 100 may be the second effect and the effect of the rock input by the user of the external communication device 200 may be the first effect. In this case, the video call providing device 100 may display, on the face of the user of the video call providing device 100 and/or on the face of the user of the external communication device 200, an effect that the user of the video call providing device lost the rock-paper-scissors game (e.g., an effect that has a direct relationship and/or correspondence to the loss of the game, etc.) and/or an effect that the user of the external communication device 200 won the rock-paper-scissors game (e.g., an effect that has a direct relationship and/or correspondence to the wining of the game, etc.).

As such, the video call providing device 100 may display, on the display unit 103, the additional effect in addition to an effect requested directly by the user to be displayed.

As another example, the user of the video call providing device 100 may get angry repeatedly. In this case, the first effect and the second effect may both be an angry effect input by the user of the video call providing device 100, and may be an effect in which the eyes of the user of the video call providing device 100 change to glaring eyes, etc. At this time, when the user of the video call providing device 100 outputs the first effect that is the angry effect, the eyes of the user of the video call providing device 100 may change to glaring eyes. Then, when the user of the video call providing device 100 outputs the second effect that is the angry effect again, an additional effect of flames (e.g., an additional and/or related effect to the first effect) around the user of the video call providing device 100 may be displayed together on the display unit 103 instead of the eyes of the user of the video call providing device 100 being changed to the glaring eyes.

As such, when the effect directly requested by the user to be displayed satisfies the desired and/or predetermined condition, the video call providing device 100 may display the additional effect that is related to the first effect on the display unit 103 instead of the second effect.

Selectively, the desired and/or predetermined condition verified by the video call providing device 100 may include a subject who transmitted the signal of displaying the first effect and a subject who transmitted the signal of displaying the second effect. For example, in order for the rock-paperscissors game to be established between the user of the video call providing device 100 and the user of the external communication device 200, the subjects who transmitted the first effect and the second effect should be different. Similarly, in order for a situation in which the additional effect of the user getting repeatedly angry is displayed to occur, the subjects who transmitted both the first effect and the second effect should be the same. As such, the video call providing device 100 may verify the subject who transmitted each effect as a condition for displaying the additional effect.

Selectively, the desired and/or predetermined condition verified by the video call providing device 100 may be whether a time elapsed from when the signal of displaying the first effect is transmitted and/or received to when the signal of displaying the second effect is transmitted and/or received is within a desired and/or predetermined time limit. In other words, in order for the rock-paper-scissors game to be established between the user of the video call providing device 100 and the user of the external communication device 200, a time (e.g., a desired time period, a desired time limit, etc.) from when one party input one of the rock, the paper, and the scissors as the first effect to when the other party input one of the rock, the paper, and the scissors as the second effect should be short, i.e., within 0.1 seconds or 0.2 seconds, but is not limited thereto. Similarly, the video call providing device 100 may determine a case in which one user input the angry effect as the first effect and then input the angry effect as the second effect again within a desired time period, e.g., several seconds, to be getting angry at the same point in time. For example, when the user of the video call providing device 100 inputs the angry effect as the first effect and then inputs the angry effect as the second effect again after three seconds (e.g., within the desired time period), the video call providing device 100 may display the additional effect by determining that the angry effects are for expressing that user is getting angrier at the same point in time. As another example, when the user of the video call providing device 100 inputs the angry effect as the first effect and then inputs the angry effect as the second effect again after 30 minutes (e.g., after the desired time period expired), the video call providing device 100 may not display the additional effect by determining that the angry effects are for expressing anger at different points in time.

Selectively, the desired and/or predetermined condition verified by the video call providing device 100 may be whether the time elapsed from when the signal of displaying the first effect is transmitted and/or received to when the signal of displaying the second effect is transmitted and/or received is within a desired and/or predetermined first time limit, within a desired and/or predetermined second time limit, or exceeded the desired and/or predetermined second time limit, but the example embodiments are not limited thereto, and there may be a greater or lesser number of time limits. Here, the length of the second time limit may be longer than that of the first time limit, etc. For example, a game in which the user of the external communication device 200 attacks and the user of the video call providing device 100 defends against the attack may be performed by using an effect during the video call. In this case, the length of the second time limit may be longer than that of the first time limit. For example, an attack effect input by the user of the external communication device 200 may be the first effect. When the user of the video call providing device 100 inputs a defense effect as the second effect within the first time limit after the first effect is input, the video call providing device 100 may determine that the user of the video call providing device 100 succeeded in defense and display the additional effect indicating that the user of the video call providing device 100 won. When the user of the video call providing device 100 inputs the defense effect as the second effect within the second time limit after the first effect is input, the video call providing device 100 may determine that the user of the video call providing device 100 half succeeded in defense and display the additional effect indicating that both parties tied. When the user of the video call providing device 100 inputs the defense effect as the second effect after the second time limit or does not input the defense effect after the first effect is input, the video call providing device 100 may determine that the user of the video call providing device 100 failed to defend and display the additional effect indicating that the user of the external communication device 200 won.

As such, the video call providing device 100 may determine whether to display the additional effect and a type of the additional effect to be displayed, based on a time interval of displaying the first effect and the second effect.

Selectively, the video call providing device 100 may determine whether the additional effect to be output is present when the first effect and the second effect are continuously transmitted and/or received through a database in the video call providing device 100. In particular, the database in the video call providing device 100 may store information about additional effects displayable on a screen and desired and/or predetermined conditions (for example, the type of the first effect, the type of the second effect, the subject who transmitted the first effect and/or the second effect, and a condition of time elapsed from when the first effect is displayed to when the second effect is displayed, etc.) for displaying each of the additional effects. The video call providing device 100 may verify whether the desired and/or predetermined condition is satisfied by referring to the database whenever effects are transmitted and received.

At operation S370, the video call providing device 100 may verify whether the determined additional effect is an effect replacing the second effect or an effect displayed together with the second effect. When it is determined that the additional effect is an effect replacing the second effect, the video call providing device 100 may display only the additional effect in response to the signal of displaying the second effect (operation S380). In other words, although the received input is a request to display the second effect, the video call providing device 100 may display only the additional effect without displaying the input second effect. When it is determined that the additional effect is not an effect replacing the second effect, the video call providing device 100 may display the second effect and the additional effect together in response to the signal of displaying the second effect (operation S390). In other words, although the received input is a request to display the second effect, the video call providing device 100 may additionally display the additional effect in addition to the second effect. At this time, the video call providing device 100 may simultaneously display the second effect and the additional effect, may sequentially display the second effect and the display the additional effect after application of desired and/or predetermined delay between the second effect and the additional effect, or may display the additional effect and then display the second effect after application of desired and/or predetermined delay.

Meanwhile, the displaying of the additional effect may occur individually for the video call providing device 100 and/or the external communication device 200, and the additional effect may not be transmitted to the other electronic device. In this case, a corresponding additional effect is displayed on the respective electronic device based on whether to display the additional effect determined by the respective electronic device. On the other hand, whether to display the additional effect may be determined by one of the video call providing device 100 and the external communication device 200, and a signal of displaying the additional effect may be transmitted from one electronic device to another electronic device. In this case, there may be two methods of displaying the additional effect.

First, referring to FIG. 4, the video call providing device 100 may determine the additional effect to be displayed (operation S410) as described above with reference to FIG. 3.

Then, the video call providing device 100 may merge the additional effect to be displayed with the video call image and/or video to be transmitted (operation S420). Next, the video call providing device 100 may display the merged image on the video call providing device 100 and transmit the merged image to the external communication device 200 (operation S430). In other words, the video call providing device 100 may merge the determined additional effect with an image and/or video to be transmitted for the video call, and then transmit the merged image (and/or merged video, etc.) to the outside to transmit information about the additional effect to the external communication device 200.

As another method, referring to FIG. 5, the video call providing device 100 may determine the additional effect to be displayed (operation S510).

Then, the video call providing device 100 may transmit the information about the determined additional effect to the external communication device 200 separately from the image (and/or video) for the video call (operation S520). In particular, the video call providing device 100 may transmit an on/off signal regarding whether to display the determined additional effect to the external communication device 200. When it is determined to display the additional effect, the video call providing device 100 may transmit the ID signal indicating the type of the determined additional effect to the external communication device 200. In this case, the external communication device 200 may select the additional effect corresponding to the ID from the database storing a plurality of effects in the external communication device 200, and display the additional effect on the display unit of the external communication device 200. In other words, even when the video call providing device 100 does not directly merge the image (and/or video) and the additional effect and transmits the additional effect to the external communication device 200, the video call providing device 100 may transmit only a signal for specifying the additional effect to the external communication device 200.

FIGS. 6 through 11 are diagrams schematically showing example forms of providing a video call service by a video call providing device, according to at least one example embodiment.

Hereinafter, the example forms of providing the video call service will be described with reference to FIGS. 6 through 11. During the description, duplicate descriptions previously given with reference to FIGS. 3 through 5 are omitted.

Figure 6:
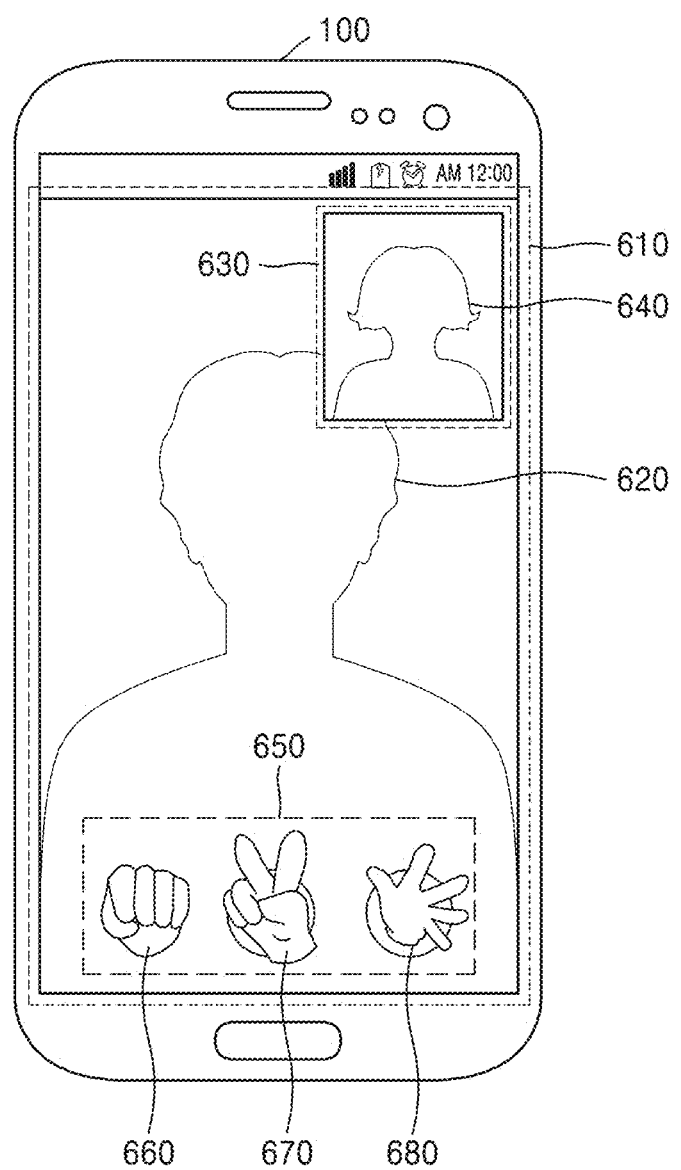
FIGS. 6 through 11 are diagrams schematically showing example forms of providing a video call service by a video call providing device, according to at least one example embodiment.

First, referring to FIG. 6, the video call providing device 100 may display a video call image 610 (e.g., image or video corresponding to the video call, etc.) on the display unit of the video call providing device 100. Here, the video call providing device 100 may display a FIG. 620 of the other party on most regions of the video call image 610. The video call providing device 100 may display a reference image 630 (e.g., a reference video, etc.) on a part of the video call image 610. The video call providing device 100 may display a FIG. 640 of the user of the video call providing device 100 on the reference image 630. The user of the video call providing device 100 is able to check (e.g., visually verify, etc.) how he/she is viewed by the other party through the reference image 630.

Here, the video call providing device 100 may display an effect selecting region 650 for transmitting an effect at the bottom of the video call image 610. For example, the video call providing device 100 may display, in the effect selecting region 650, a user interface (UI) for playing a game over the video call, such as a UI 600 for selecting a rock effect, a UI 670 for selecting a scissors effect, and a UI 680 for selecting a paper effect, etc., but the example embodiments are not limited thereto, and the participants of the video call may play other games and/or apply other features, etc.

Figure 7:
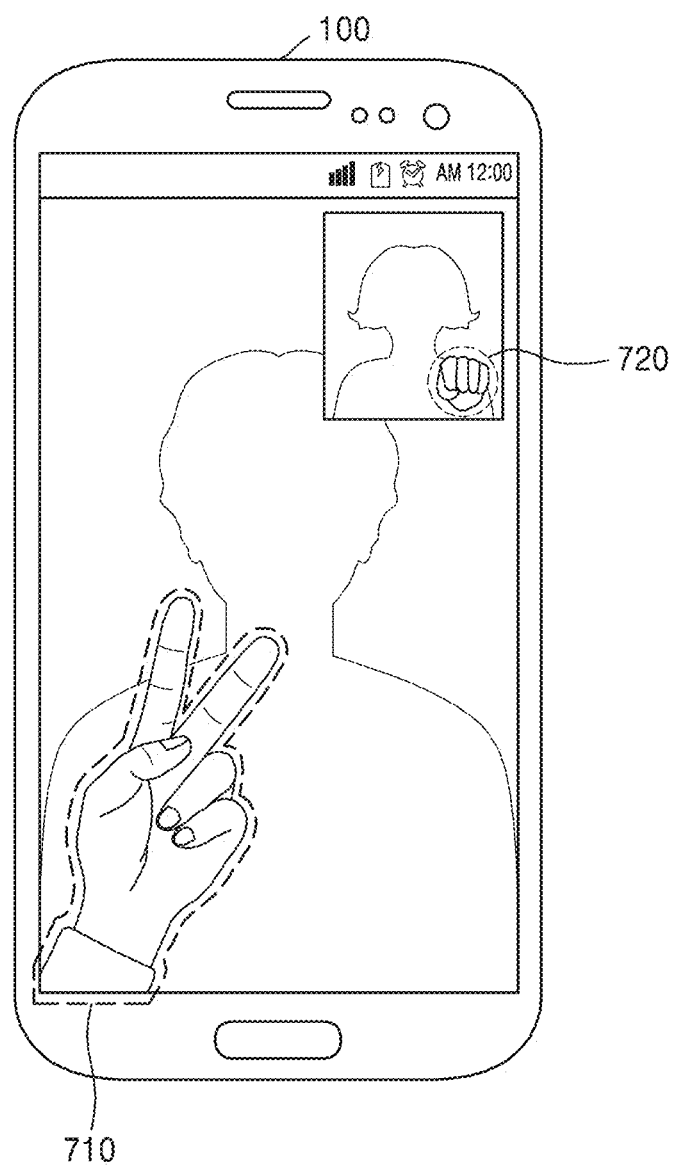

Then, referring to FIG. 7, the video call providing device 100 may display the rock, the paper, or the scissors, etc., selected by the user of the video call providing device 100 and the user of the external communication device 200 on the display unit of the video call providing device 100. First, when the user of the external communication device 200 selects the scissors, the video call providing device 100 may display a scissors effect 710 on the video call image 610. In other words, the video call providing device 100 may display an effect as if the user of the external communication device 200 shows the scissors in a rock-paper-scissors game. Similarly, when the user of the video call providing device 100 selects the rock, the video call providing device 100 may display a rock effect 720 on the reference image 630. In other words, the video call providing device 100 may display an effect as if the user of the video call providing device 100 shows the rock in the rock-paper-scissors game.

Figure 8:
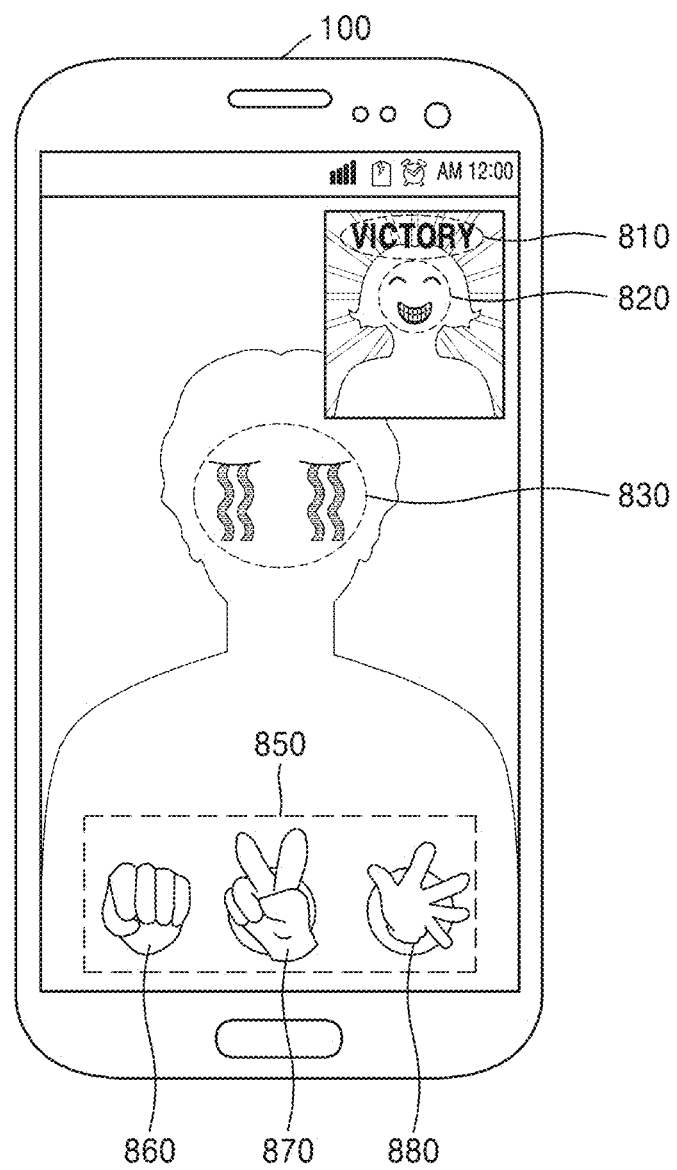

Then, referring to FIG. 8, the video call providing device 100 may display additional effects on the display unit of the video call providing device 100 related to the game, for example, effects in which the user of the video call providing device 100 who won the rock-paper-scissors game is happy, and the user of the external communication device 200 who lost the rock-paper-scissors game is sad, etc. For example, the video call providing device 100 may display a victory phrase effect 810 indicating that the user of the video call providing device 100 won and a smiling facial expression effect 820 on the FIG. 640 of the user of the reference image 630. Similarly, the video call providing device 100 may display a tear effect 830 on the FIG. 620 of the other party. The video call providing device 100 may further display an effect selecting region 850 for an additional game session (e.g., an additional rock-paper-scissors game), a UI 860 for selecting a rock effect, a UI 870 for selecting a scissors effect, and a UI 880 for selecting a paper effect, etc.

Figure 9:
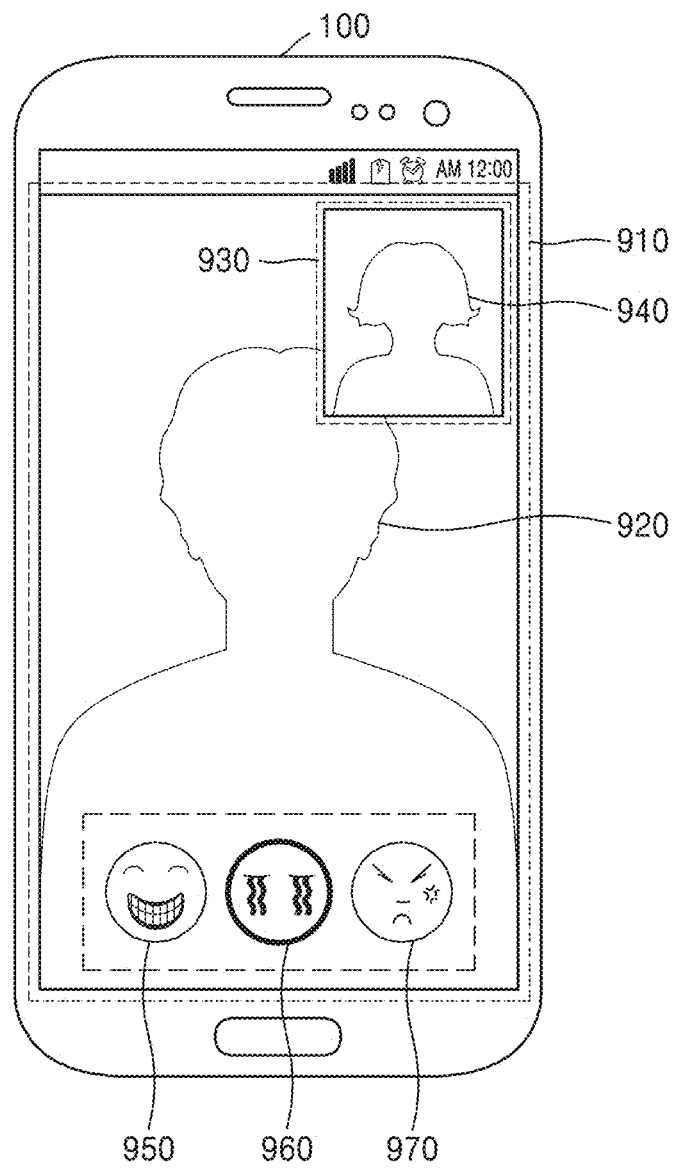

Then, referring to FIG. 9, the video call providing device 100 may display a video call image 910 on the display unit of the video call providing device 100. Here, the video call providing device 100 may display a FIG. 920 of the other party in most regions of the video call image 910. The video call providing device 100 may display a reference image 930 on a part of the video call image 910. The video call providing device 100 may display a FIG. 940 of the user of the video call providing device 100 on the reference image 930.

Here, the video call providing device 100 may display an effect selecting region for transmitting an effect at the bottom of the video call image 910. The video call providing device 100 may display UIs for selecting various effects in the effect selecting region. For example, the video call providing device 100 may display a UI 950 for selecting a happy facial expression, a UI 960 for selecting a crying facial expression, and a UI 970 for selecting an angry facial expression, etc., in the effect selecting region. It is assumed that the user of the video call providing device 100 selected the UI 960 for selecting the crying facial expression.

Figure 10:
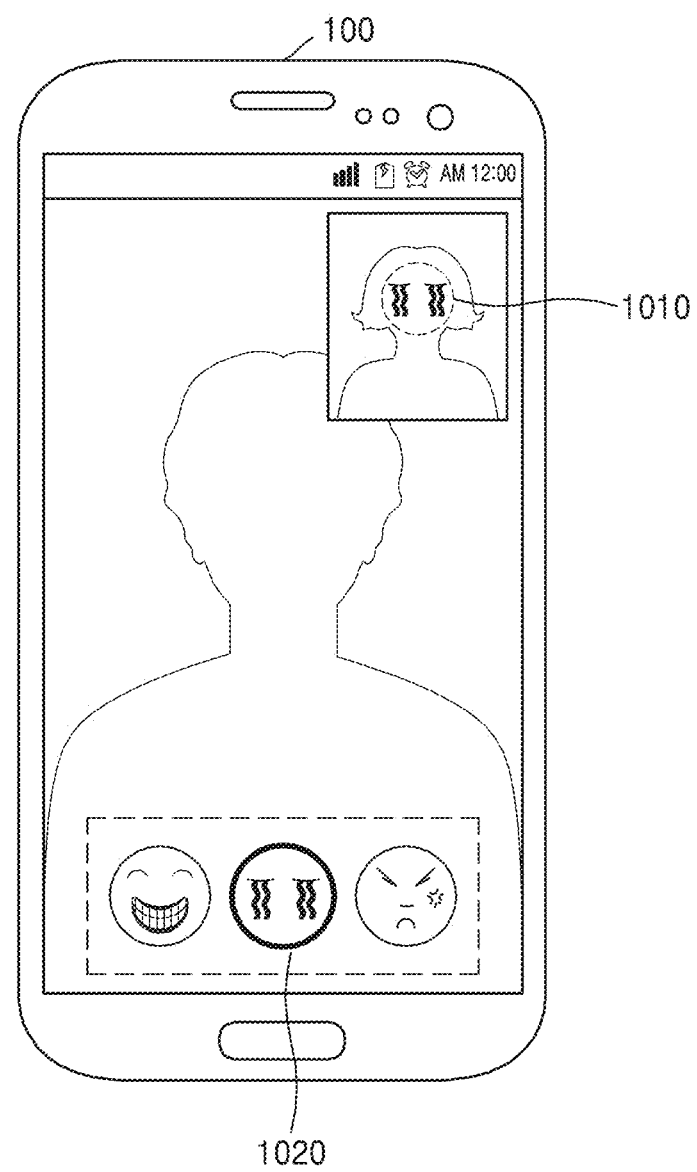

In this case, referring to FIG. 10, the video call providing device 100 may display a crying facial expression effect 1010 on the FIG. 940 of the user of the reference image 930. It is assumed that the user of the video call providing device 100 selected a UI 1020 for selecting a crying facial expression again while the crying facial expression effect 1010 is displayed on the FIG. 940 of the user.

Figure 11:
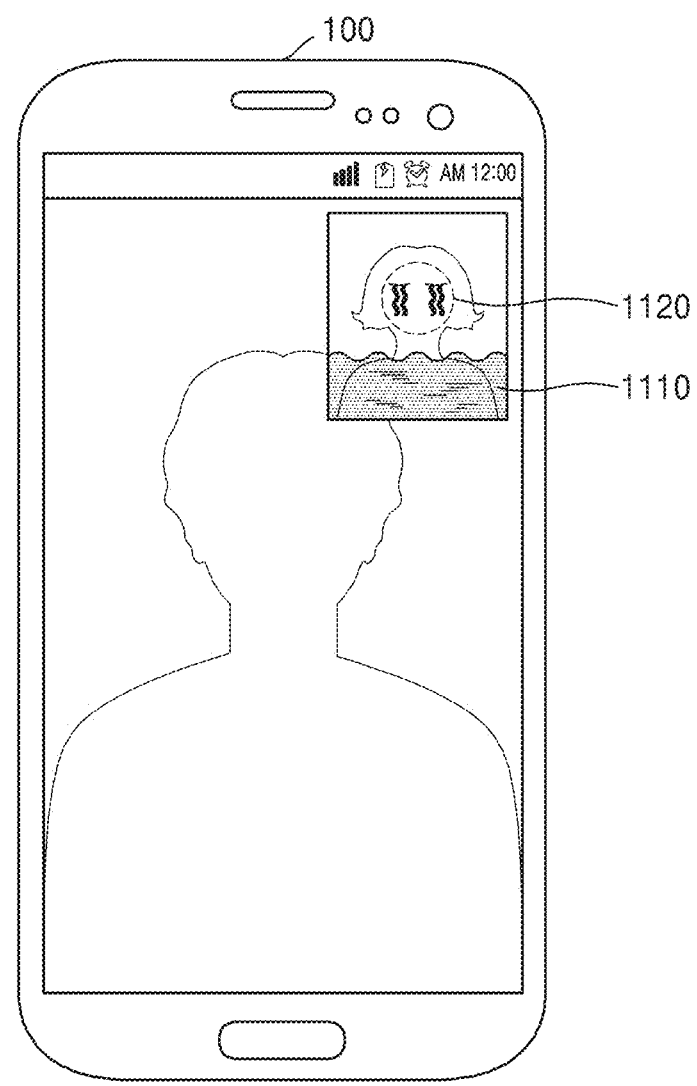

In this case, referring to FIG. 11, the video call providing device 100 may display a sea of tears effect 1110 on the FIG. 940 of the user of the reference image 930. Here, the video call providing device 100 may display a crying facial expression effect 1120 together with the sea of tears effect 1110.

The example embodiments described above may be embodied in a form of a computer program, including computer readable instructions, executable on a computer via various components, and such a computer program may be recorded on a computer-readable recording medium. Here, the medium may continuously store a computer-executable program or may temporarily store the computer-executable program to be executed or downloaded. Also, the medium may be various non-transitory recording means or storage means of single hardware or a combination of plurality of pieces of hardware, and is not limited to a medium directly accessing a computer program, but may be distributed on a network. Examples of the non-transitory medium include magnetic media, such as a hard disk, a floppy disk, and magnetic tape, optical recording media, such as a CD-ROM and a DVD, magneto-optical media such as a floptical disk, and ROM, RAM, and a flash memory, which are configured to store program instructions. Also, other examples of the medium include recording media or storage media managed by an application store distributing applications, a website or server supplying or distributing other various types of software, and the like.

Meanwhile, the computer program may be specially designed and configured for the example embodiments. Examples of the computer software include not only mechanical code prepared by a compiler, but also high level languages executable by a computer by using an interpreter.

The particular implementations shown and described herein are illustrative example embodiments and are not intended to otherwise limit the scope of the present disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

Accordingly, the aspects of the present disclosure should not be construed as being limited to the example embodiments described above, and not only the appended claims, but also all equal or equivalent modifications of the claims fall within the scope of the present disclosure.

The example embodiments relate to technology applicable to a device for providing a video call function and enables a user who is on the phone via the video call function to transmit or receive a visual additional effect. One or more of the example embodiments are applicable to a video call providing device, system, and/or a video call providing method for increasing satisfaction of a video call service by enabling a person using a video call to add an additional effect to a video.

The invention claimed is:

1. A video call providing method using a video call providing device capable of performing a video call with an external communication device, the video call providing method comprising:
    receiving, using at least one processor of a video call providing device, a first effect signal during a video call between the video call providing device and an external communication device, the first effect signal including information regarding a first effect corresponding to the video call, the first effect input via a first user input;
    receiving, using the at least one processor, a second effect signal, the second effect signal including information regarding a second effect corresponding to the video call, the second effect input via a second user input;
    verifying, using the at least one processor, an effect type of the first effect, and an effect type of the second effect, the verifying including,
        determining whether the first user input was input by a first user of the video call providing device or a second user of the external communication device, and
        determining whether the second user input was input by the first user or the second user;
    determining, using the at least one processor, whether an additional effect associated with the first effect and the second effect is to be automatically displayed based on results of the verifying; and
    displaying, using the at least one processor, the first effect and the additional effect on a display device based on results of the determining whether the additional effect is to be displayed.

2. The video call providing method of claim 1, wherein the determining whether the additional effect is to be displayed comprises determining whether the additional effect is to be displayed with the first effect and the second effect based on rules stored in a database included with the video call providing device.

3. The video call providing method of claim 1, wherein the verifying comprises verifying whether a time elapsed between when the first effect signal is received and when the second effect signal is received is within a desired time limit.

4. The video call providing method of claim 1, wherein the verifying comprises verifying whether a time elapsed between when the first effect signal is received and when the second effect signal is received is within a desired first time limit, exceeds the desired first time limit and is within a desired second time limit, or exceeds the desired second time limit.

5. The video call providing method of claim 1, wherein
    the determining whether the additional effect is to be displayed comprises determining whether to provide the additional effect instead of the second effect based on the results of the verifying; and
    the displaying comprises omitting display of the second effect and displaying the additional effect based on results of the determining whether to provide the additional effect instead of the second effect.

6. The video call providing method of claim 1, wherein
the determining whether the additional effect is to be displayed comprises determining whether to provide the additional effect together with the second effect based on the results of the verifying; and
the displaying comprises displaying the additional effect simultaneously with the second effect or displaying the second effect and then displaying the additional effect after application of a desired delay.

7. The video call providing method of claim 1, further comprising:
merging, using the at least one processor, the additional effect with the video call based on the results of the verifying; and
displaying, using the at least one processor, the merged video call on the display device.

8. The video call providing method of claim 1, further comprising:
transmitting, using the at least one processor, an additional effect signal to the external communication device based on the results of the verifying, the additional effect signal indicating whether to display the additional effect, and information indicating an effect type of the additional effect.

9. A non-transitory computer readable medium storing a computer program, which when executed by at least one processor, causes the at least one processor to execute the method of claim 1.

10. A video call providing device comprising:
a memory having computer readable instructions stored thereon; and
at least one processor configured to execute the computer readable instructions to,
receive a first effect signal during a video call between the video call providing device and an external communication device, the first effect signal including information regarding a first effect corresponding to the video call, the first effect input via a first user input,
receive a second effect signal, the second effect signal including information regarding a second effect corresponding to the video call, the second effect input via a second user input,
verify an effect type of the first effect and an effect type of the second effect, the verification including,
determining whether the first user input was input by a first user of the video call providing device or a second user of the external communication device, and
determining whether the second user input was input by the first user or the second user;
determine whether an additional effect associated with the first effect and the second effect is to be automatically displayed based on results of the verification, and
display the first effect and the additional effect on a display device based on results of the determining whether the additional effect is to be displayed.

11. The video call providing device of claim 10, further comprising:
a database configured to store information regarding a plurality of effects corresponding to the video call, the plurality of effects including the first effect and the second effect; and
wherein the at least one processor is further configured to determine whether the additional effect is to be displayed with the first effect and the second effect based on the information stored in the database.

12. The video call providing device of claim 10, wherein the at least one processor is further configured to verify whether a time elapsed between when the first effect signal is received and when the second effect signal is received is within a desired time limit.

13. The video call providing device of claim 10, wherein the at least one processor is further configured to verify whether a time elapsed between when the first effect signal is received to when the second effect signal is received is within a desired first time limit, exceeds the desired first time limit and within a desired second time limit, or exceeds the desired second time limit.

14. The video call providing device of claim 10, wherein the at least one processor is further configured to:
determine whether to provide the additional effect instead of the second effect, based on the results of the verification; and
omit the displaying of the second effect and display the additional effect on the display device based on results of the determination of whether to provide the additional effect instead of the second effect.

15. The video call providing device of claim 10, wherein the at least one processor is further configured to:
determine whether to provide the additional effect together with the second effect based on the results of the verification; and
display the additional effect simultaneously with the second effect, or display the second effect and then display the additional effect after application of a desired delay, on the display device.

16. The video call providing device of claim 10, wherein the at least one processor is further configured to:
merge the additional effect with the video call based on the results of the verification; and
display the merged video call on the display device.

17. The video call providing device of claim 10, wherein the at least one processor is further configured to transmit an additional effect signal to the external communication device based on the results of the verification, the additional effect signal indicating whether to display the additional effect, and information indicating an effect type of the additional effect.

* * * * *